United States Patent [19]

Odashima

[11] Patent Number: 5,801,215
[45] Date of Patent: *Sep. 1, 1998

[54] BAKED PENCIL LEAD AND METHOD FOR MANUFACTURING THE SAME

[75] Inventor: Hideo Odashima, Sawa-gun, Japan

[73] Assignee: Mitsubishi Pencil Kabushiki Kaisha, Tokyo, Japan

[*] Notice: The term of this patent shall not extend beyond the expiration date of Pat. No. 5,430,075.

[21] Appl. No.: 506,681

[22] Filed: Jul. 25, 1995

[30] Foreign Application Priority Data

Aug. 12, 1994 [JP] Japan ................... 6-190502

[51] Int. Cl.$^6$ ................... G09D 13/00
[52] U.S. Cl. ................... 523/164; 524/495; 524/496; 428/408
[58] Field of Search ................... 523/164; 524/495, 524/496, 502, 503, 540, 541; 428/408

[56] References Cited

U.S. PATENT DOCUMENTS

| | | |
|---|---|---|
| 3,928,520 | 12/1975 | Shinomoto et al. ................ 264/42 |
| 4,371,632 | 2/1983 | Grossman et al. ................ 523/164 |
| 5,430,075 | 7/1995 | Odashima ................ 523/164 |

FOREIGN PATENT DOCUMENTS

| | | |
|---|---|---|
| 416360 | 5/1968 | Australia . |
| 2,149,565 | 3/1983 | France . |
| 1519156 | 10/1969 | Germany . |
| 43 32 582 | 3/1994 | Germany . |
| Sho 62-64876 | 3/1987 | Japan . |
| Sho 62-129370 | 6/1987 | Japan . |
| Hei 1-49750 | 2/1988 | Japan . |
| Sho 63-156873 | 6/1988 | Japan . |
| Sho 64-38297 | 2/1989 | Japan . |

OTHER PUBLICATIONS

Database WPI, Section Ch, Week 8017, Derwent Publications Ltd., London, GB; Mar. 1980 (abstract).

*Primary Examiner*—James J. Seidleck
*Assistant Examiner*—U. K. Rajguru
*Attorney, Agent, or Firm*—Darby & Darby

[57] ABSTRACT

Baked pencil leads are disclosed herein which are prepared by kneading, extruding and baking a composition containing a graphite as a filler and a binder, wherein a degree of orientation π of the graphite in the direction of an extrusion axis measured by X-ray diffraction is 0.85 or more and the resultant leads have a flexural modulus of 100 GPa or more and a bending strength of 320 MPa or more. The baked pencil leads can be manufactured by carrying out the extrusion so that back face pressure just above an extrusion nozzle may be 300 kg/cm or more and a shear rate at a time when the molten kneaded composition passes through the nozzle may be $5 \times 10^4$ (1/sec) or more.

9 Claims, No Drawings

BAKED PENCIL LEAD AND METHOD FOR MANUFACTURING THE SAME

BACKGROUND OF THE INVENTION

(1) Field of the Invention

The present invention relates to a baked pencil lead and a method for manufacturing the baked pencil lead. More specifically, it relates to a baked pencil lead manufactured by blending a graphite which is a filler and a binder as main components with a pore forming agent, kneading and extruding the blended components, and then subjecting it to a heat treatment at a high temperature; and a method for manufacturing the baked pencil lead. The graphite in the baked pencil lead obtained is highly oriented in the direction of an extrusion axis, and the baked pencil lead has well balanced strength, density and a writing performance.

(2) Description of the Prior Art

Conventional wood-cased pencil leads and mechanical pencil leads have been manufactured by adding a binder such as a clay, a natural polymer, a synthetic polymer, a pitch and an asphalt to a colorant such as a graphite and carbon black, further, if necessary, adding a suitable solvent and plasticizer, kneading the composition, extruding the kneaded composition into a linear shape, baking it at a temperature of 900° to 1,200° C., and then impregnating the pores of the obtained baked lead with an oil.

Of the conventional baked pencil leads, particularly the mechanical pencil leads having a small diameter are poor in strength, and for this reason, these leads do not have the practical strength yet, depending upon hardness.

In order to improve the strength of the leads, various methods have been suggested. For example, Japanese Patent Application Laid-open No. Sho 62-64876 has suggested a method which comprises extracting and removing a plasticizer or a solvent from a kneaded composition containing the plasticizer or solvent, a colorant and a binder, and then extruding the composition.

In Japanese Patent Application Laid-open No. Sho 62-129370, as a method for enhancing the strength without impairing a writing performance, there is suggested a method for manufacturing a pencil lead which comprises blending a graphite whisker thereto.

Furthermore, Japanese Patent Application Laid-open No. Sho 63-156873 has suggested mechanical pencil leads having a constant density, less breakable properties and a smooth writing effect, which are manufactured by adding an aluminate-based coupling agent thereto.

According to confirmation tests of these methods, the strength can be improved in all the methods, but the density deteriorates, and the writing performance also tends to deteriorate.

In addition, various methods have been suggested in which much attention is paid to the orientation state of a filler in the leads to improve it.

For example, Japanese Patent Application Laid-open No. Sho 64-38297 has suggested organic baked pencil reads having a diameter of 1.8 mm or more in which Young's modulus (flexural modulus) is $1.3 \times 10^{11}$ dyn/cm$^2$ (13 GPa) or more. This patent is limited to the organic baked leads having a large diameter of 1.8 mm or more, and detailed reference is not made to the relation between the flexural modulus and the strength of the leads. Moreover, in the thick leads having a large diameter of 1.8 mm or more, such a high shear rate as in the present invention can scarcely be obtained.

Japanese Patent Publication No. Hei 1-49750 has suggested low-loading leads in which boron nitride is mainly used as a lubricant and a ratio of the peak height of (002) plane to the peak height of (100) plane of the hexagonal system boron nitride is 40 or less in X-ray diffraction obtained by irradiating the leads with X-ray vertically to the extrusion axis of the leads. This patent is limited to the leads mainly containing the boron nitride as the lubricant. In addition, according to information obtained from the X-ray diffraction and the detailed description of the suggested invention, it is apparent that the plate boron nitride is arranged at random in the direction of an extrusion axis, so that the boron nitride arranged vertically to the extrusion axis increases. Therefore, the disclosed patent is quite different from the present invention in conception.

SUMMARY OF THE INVENTION

An object of the present invention is to provide baked pencil lead having well balanced strength, density and a writing performance.

Another object of the present invention is to provide a method for manufacturing the baked pencil lead.

According to one aspect of the present invention, there is provided a baked pencil lead manufactured by the method comprising the steps of kneading a composition containing a graphite as a filler and a binder, extruding the kneaded composition, and baking the extruded product, wherein a degree of orientation $\pi$ of the graphite in the direction of an extrusion axis measured by X-ray diffraction is 0.85 or more and the resultant baked pencil lead has a flexural modulus of 100 GPa or more and a bending strength of 320 MPa or more.

According to another aspect of the present invention, there is provided a method for manufacturing a baked pencil lead comprising the steps of kneading a composition containing a graphite as a filler and a binder together with a pore forming agent, extruding the kneaded composition so that back face pressure just above an extrusion nozzle may be 300 kg/cm$^2$ or more and a shear rate at a time when the molten kneaded composition passes through the extrusion nozzle may be $5 \times 10^4$ (1/sec) or more, and baking the extruded product.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

The present inventor has intensively researched to solve the above-mentioned problems, and as a result, it has been found that the strength of a lead is extremely closely correlated with the flexural modulus of the lead and the degree of orientation $\pi$ of a graphite in the lead in the direction of an extrusion axis measured by X-ray diffraction. It is noted that the graphite crystals which are used as a filler have a plate-like and flat shape and its theoretical modulus is 1020 GPa which is much higher than those of other materials. Therefore, if the graphite is highly oriented in the direction of the extrusion axis in the baked pencil lead comprising the graphite and a carbon binder, the extremely high flexural modulus and strength can be exerted.

In order to exert the necessary and sufficient strength in the baked pencil lead, it is desirable that the degree of orientation π of the graphite in the lead in the direction of the extrusion axis is 0.85 or more, preferably 0.87 or more, and the flexural modulus of the lead is 100 GPa or more, preferably 110 GPa, whereby the lead having a strength of 320 MPa or more can be obtained.

The above-mentioned degree of orientation π represents the degree of the orientation to the direction of the extrusion axis of the graphite crystals in the lead, and it is meant that the closer to 1 this value is, the higher the development of the orientation is.

According to the X-ray diffraction, the X-ray is applied to the leads vertically to the direction of the extrusion axis of the leads, and an azimuth angle 2θ is scanned from 0° to 90° to confirm the position of the azimuth angle indicating the maximum value of an intensity distribution on (002) plane (about 26°). Next, the leads are rotated 180° in the vertical plane of an X-ray beam at the position of this azimuth angle, whereby the intensity distribution on the (002) plane is taken, and the degree of orientation π is calculated on the basis of a half width (H) at a point of ½ of the maximum intensity value in accordance with the following equation (1)

$$\text{Orientation degree } \pi = (180-H)/180 \tag{1}$$

The flexural modulus of the leads is calculated in accordance with the following equation (2)

$$\text{Flexural modulus} = 4PL^3/3\pi d^4 \delta \text{ (GPa)} \tag{2}$$

wherein P is a load at the measurement of bending strength, L is a distance between supports, d is a diameter of the leads, δ is a strain, and π is the ratio of the circumference of a circle to its diameter.

On the basis of these knowledges, the present inventor has paid much attention to extrusion conditions at the time of the extrusion molding as a concrete means for enhancing the degree of orientation π in the direction of an extrusion axis of the graphite in the leads, and as a result, it has been found that the degree of orientation π in the direction of the extrusion axis of the graphite in the leads and the flexural modulus can be enhanced by controlling back face pressure just above an extrusion nozzle at the time of extrusion molding and a shear rate at a time when a molten kneaded composition passes through the extrusion nozzle. In consequence, there can be obtained a baked pencil lead having well balanced strength, density and a writing performance and the present invention has been completed.

That is to say, the gist of the present invention is as follows:

(1) there is provided a baked pencil leads manufactured by the method comprising the steps of kneading a composition containing a graphite as a filler and a binder, extruding the kneaded composition, and baking the extruded product, wherein a degree of orientation π of the graphite in the direction of an extrusion axis measured by X-ray diffraction is 0.85 or more and the resultant baked pencil lead has a flexural modulus of 100 GPa or more and a bending strength of 320 MPa or more;

(2) there is also provided a method for manufacturing a baked pencil lead comprising the steps of kneading a composition containing a graphite as a filler and a binder together with a pore forming agent, extruding the kneaded composition so that back face pressure just above an extrusion nozzle may be 300 kg/cm² or more and a shear rate at a time when the molten kneaded composition passes through the extrusion nozzle may be 5×10⁴ (1/sec) or more, and baking the extruded product.

Next, the method for manufacturing a baked pencil lead regarding the present invention will be described in detail.

A binder such as a natural polymer, a synthetic polymer, a pitch and an asphalt is added to a graphite as a filler, and a pore forming agent is further added thereto. In addition, if necessary, a suitable solvent and plasticizer are added thereto. Then, they are kneaded, and the kneaded composition is then extruded into a linear shape. In this case, extrusion conditions are set so that back face pressure just above an extrusion nozzle may be 300 kg/cm² or more, preferably 350 kg/cm² or more and so that a shear rate at a time when the molten kneaded composition passes through the extrusion nozzle may be 5×10⁴ (1/sec) or more, preferably 7×10⁴ (1/sec). The control of the extrusion conditions can be achieved by not only suitably selecting the materials to be used, regulating their blend, but also suitably combining a screw shape of an extruder, an extrusion temperature, an extrusion rate, a nozzle diameter and the like.

The shear rate at the time when the molten kneaded composition passes through the nozzle can be calculated in accordance with the following equation (3)

$$\text{Shear rate} = 4Q/\pi R^3 \text{ (1/sec)} \tag{3}$$

wherein Q is a flow rate (cm³/sec), R is a radius of the nozzle (cm), and π is the ratio of the circumference of a circle to its diameter.

If both the conditions of the back face pressure and the shear rate are not simultaneously met, the necessary and sufficient bending strength cannot be exerted.

Even if the back face pressure just above the extrusion nozzle is 300 kg/cm² or more, the degree of orientation in the direction of an extrusion axis of the graphite in the lead cannot be sufficiently heightened in the case that the shear rate at the time when the molten kneaded composition passes through the nozzle is less than 5×10⁴ (1/sec). In consequence, the sufficient strength cannot be exerted.

Conversely, even if the shear rate is 5×10⁴ (1/sec) or more, the sufficient strength cannot be exerted in the case that the back face pressure just above the extrusion nozzle is less than 300 kg/cm². Under these conditions, the degree of orientation π in the direction of the extrusion axis of the graphite in the lead and the flexural modulus of the lead is relatively high, but the sufficient strength cannot be exerted. This reason can be considered to be that the back face pressure just above the extrusion nozzle is low, and hence sufficient compression stress cannot be applied to the molten kneaded composition, so that the cross-sectional tissue of the leads is not closely compacted, with the result that the sufficient strength cannot be exerted.

In addition, when one blend composition is extruded changing the diameter alone of the extrusion nozzle at the time of the extrusion molding, there is a tendency that the smaller the diameter of the nozzle is, the higher the strength is. This reason can be considered to be that the smaller the diameter of the nozzle is, the larger a ratio (a ram ratio) of the screw diameter to the nozzle diameter of the extruder is, so that the back face pressure just above the extrusion nozzle increases, and as also understood from the equation (3), the smaller the nozzle diameter is, the higher the shear rate at the time when the molten kneaded composition passes through the nozzle is.

The linear product thus obtained by the extrusion molding is baked at a temperature of 900° to 1200° C., and the pores of the obtained baked product are then impregnated with an oil to obtain the pencil leads of the present invention.

Examples of the filler which can be used in the present invention include natural graphites, artificial graphites and kish graphites, and they can be used singly or in a combination of two or more kinds thereof. The average particle diameter of the filler is preferably 50 μm or less, more preferably 1 to 10 μm. If the particle diameter of the filler is more than 50 μm, the sufficient strength cannot be exerted, and if it is less than 1 μm, the orientation of the filler is poor, the necessary strength cannot be exerted, and hardness merely increases inconveniently. In this connection, the filler which is used herein plays not only a role as a reinforcing agent but also a role as a colorant.

Examples of the binder which can be used in the present invention include thermoplastic resins such as vinyl chloride resins, chlorinated vinyl chloride resins and polyvinyl alcohols, thermosetting resins such as furan resins, phenolic resins and epoxy resins, natural polymers such as lignins, celluloses and tragacanth gums, pitches such as petroleum asphalt, coal tar pitch, naphtha cracking pitch and dry distillation pitch of a synthetic resin or the like, and they can be used singly or in a combination of two or more thereof.

For the purpose of improving the characteristics of the composition at its kneading which is carried out adding high shear strength and/or improving the characteristics of the composition at the extrusion molding, there may be added, if necessary, one or more of plasticizers or solvents such as dioctyl phthalate (DOP), dibutyl phthalate (DBP), tricresyl phosphate (TCP), dioctyl adipate (DOA), diaryl phthalate (DAP), propylene carbonate, alcohols, ketones and esters.

The writing performance of the pencil leads depends subtly upon not only the smoothness of the graphite but also the pores present in the pencil leads. Thus, in addition to the formation of the pores by the decomposition of the binder, the plasticizer and the like, a pore forming agent may be blended with the filler, the binder and the like, whereby a porosity and a pore distribution can be artificially regulated. Typical examples of the pore forming agent include sublimable organic compounds such as anthraquinone, fumaric acid and isophthalic acid, and depolymerizable polymers such as polyethylene, polypropylene and polytetrafluoroethylene. One or more of these pore forming agents may be added, if necessary.

EXAMPLES

Next, the present invention will be described in more detail with reference to examples, but the scope of the present invention should not be limited to these examples at all.

Examples 1 to 3, Comparative Example 1

| Graphite (natural scaly graphite; average particle diameter = 7 μm) | 50 parts by weight |
|---|---|
| Polyvinyl chloride | 50 parts by weight |
| Stearate | 3 parts by weight |
| Dioctyl phthalate | 20 parts by weight |

These components were mixed by a Henschel mixer, kneaded by a pressure kneader and a twin-roll mill, and then extruded into a linear shape by the use of a screw type extruder equipped with an extrusion nozzle having a nominal diameter of 0.5 mmφ at an extrusion temperature of 100° C., while the rotational frequency of a screw was changed as occasion demands so as to obtain four shear rates. Afterward, the extruded composition was subjected to a heat treatment at 180° C. for 10 hours in air in order to remove the remaining plasticizer therefrom, and at this time, the composition was solidified. After a certain time, the solidified composition was heated up to 300° C. at 10° C./hr and from 300° C. to 1000° C. at 30° C./hr in a nitrogen atmosphere, baked at 1000° C. for 1 hour, and finally immersed in alpha olefin oligomer (trade name Lipolub 20, made by Lion Co., Ltd.) to cause oil immersion, thereby obtaining mechanical pencil leads having a diameter of 0.570 mm.

Examples 4 to 6, Comparative Example 2

The same blend and the same procedure as in Examples 1 to 3 were used except that the blend was extruded into a linear shape by the use of a screw type extruder equipped with an extrusion nozzle having a nominal diameter of 0.3 mmφ at an extrusion temperature of 100° C., while the rotational frequency of a screw was changed as occasion demands so as to obtain four shear rates, thereby obtaining mechanical pencil leads having a diameter of 0.380 mm.

Comparative Examples 3 to 6

The same blend and the same procedure as in Examples 1 to 3 were used except that the blend was extruded into a linear shape at an extrusion temperature of 125° C., while the rotational frequency of a screw was changed as occasion demands so as to obtain four shear rates, thereby obtaining mechanical pencil leads having a diameter of 0.570 mm.

With regard to Examples 1 to 6 and Comparative Examples 1 to 6, back face pressures at the time of the extrusion molding were measured, and the shear rates were calculated in accordance with the above-mentioned equation (3). For the obtained mechanical pencil leads, flexural moduli were calculated in accordance with the above-mentioned equation (2), and the degree of orientation π were calculated in accordance with the above-mentioned equation (1) by virtue of X-ray diffraction. In addition, bending strengths (MPa), densities (D) and hardnesses were obtained in accordance with JIS S6005. The results are shown in Table 1.

TABLE 1

| | Extrusion Characteristics | |
|---|---|---|
| | Back face Pressure (kg/cm$^2$) | Shear Rate (1/sec) |
| Comp. Ex. 1 | 550 | $3 \times 10^4$ |
| Example 1 | 450 | $6 \times 10^4$ |
| Example 2 | 400 | $9 \times 10^4$ |
| Example 3 | 380 | $1 \times 10^5$ |
| Comp. Ex. 2 | 800 | $4 \times 10^4$ |
| Example 4 | 700 | $8 \times 10^4$ |
| Example 5 | 630 | $1 \times 10^5$ |
| Example 6 | 610 | $3 \times 10^5$ |
| Comp. Ex. 3 | 350 | $3 \times 10^4$ |
| Comp. Ex. 4 | 270 | $6 \times 10^4$ |
| Comp. Ex. 5 | 240 | $9 \times 10^4$ |
| Comp. Ex. 6 | 220 | $1 \times 10^5$ |

| | Performance of Leads | | | | |
|---|---|---|---|---|---|
| | Flexural Modulus (GPa) | Degree of Orientation (π) | Strength (MPa) | Density (D) | Hardness |
| Comp. Ex. 1 | 90 | 0.83 | 300 | 0.33 | About HB |
| Example 1 | 115 | 0.88 | 390 | 0.32 | About HB |
| Example 2 | 125 | 0.91 | 430 | 0.32 | About HB |
| Example 3 | 130 | 0.92 | 450 | 0.31 | About HB |
| Comp. Ex. 2 | 95 | 0.84 | 310 | 0.21 | About HB |
| Example 4 | 120 | 0.90 | 450 | 0.20 | About HB |
| Example 5 | 130 | 0.92 | 480 | 0.20 | About HB |
| Example 6 | 135 | 0.93 | 500 | 0.20 | About HB |
| Comp. Ex. 3 | 80 | 0.82 | 250 | 0.33 | About HB |

TABLE 1-continued

| | | | | | |
|---|---|---|---|---|---|
| Comp. Ex. 4 | 100 | 0.86 | 280 | 0.33 | About HB |
| Comp. Ex. 5 | 110 | 0.87 | 300 | 0.32 | About HB |
| Comp. Ex. 6 | 110 | 0.87 | 310 | 0.32 | About HB |

As is apparent from the results of the examples, according to the present invention, when extrusion conditions are controlled so that back face pressure just above an extrusion nozzle at the extrusion molding may be 300 kg/cm² or more and so that a shear rate at a time when a molten kneaded composition passes through an extrusion nozzle may be 5×10⁴ (1/sec) or more, and in baked pencil leads obtained under such conditions, the degree of orientation π of a graphite in the direction of an extrusion axis measured by X-ray diffraction becomes 0.85 or more, and the flexural modulus and the bending strength of the leads become 100 GPa or more and 320 MPa or more, respectively. Thus, in the baked pencil leads of the present invention, the strength can be remarkably improved without lowering density, and strength, density and a writing performance are suitably balanced.

What is claimed is:

1. A baked pencil lead manufactured by a method comprising the steps of:
   kneading a composition containing a graphite, wherein said graphite acts as a filler and a binder;
   extruding the kneaded composition at a controlled back face pressure of at least 300 kg/cm² and at a controlled shear rate at the time the molten kneaded composition passes through an extrusion nozzle of at least 5×10⁴ (1 sec); and
   baking the extruded product;
   wherein the resultant degree of orientation π of the graphite in the direction of an extrusion axis is at least 0.85 and the baked pencil lead has a flexural modulus of at least 100 Gpa and a bending strength of at least 320 Mpa.

2. The baked pencil lead according to claim 1, wherein the graphite is selected from group consisting of natural graphites, artificial graphites, kish graphites and mixtures thereof.

3. The baked pencil lead according to claim 1, wherein the average particle diameter of the graphite is 50 µm or less.

4. The baked pencil lead according to claim 1, wherein the binder is selected from the group consisting of thermoplastic resins, thermosetting resins, natural polymers, pitches and mixtures thereof.

5. The baked pencil lead according to claim 4, wherein the thermoplastic resin is selected from the group consisting of vinyl chloride resins, chlorinated vinyl chloride resins, polyvinyl alcohols and mixtures thereof.

6. The baked pencil lead according to claim 4, wherein the thermosetting resin is selected from the group consisting of furan resins, phenolic resins, epoxy resins and mixtures thereof.

7. The baked pencil lead according to claim 4, wherein the natural polymer is selected from the group consisting of lignins, celluloses, tragacanth gums and mixtures thereof.

8. The baked pencil lead according to claim 4, wherein the pitch is selected from the group consisting of petroleum asphalt, coal tar pitch, naphtha cracking pitch, dry distillation pitch and mixtures thereof.

9. The baked pencil lead according to claim 1, wherein the composition contains a plasticizer or a solvent selected from the group consisting of dioctyl phthalate, dibutyl phthalate, tricresyl phosphate, dioctyl adipate, diaryl phthalate, propylene carbonate, alcohols, ketones, esters and mixtures thereof.

* * * * *